US010493407B2

(12) United States Patent
Requate et al.

(10) Patent No.: US 10,493,407 B2
(45) Date of Patent: Dec. 3, 2019

(54) FILTRATION DEVICE

(71) Applicant: Sartorius Stedim Biotech GmbH, Goettingen (DE)

(72) Inventors: Wilhelm Requate, Heiligenstadt (DE); Gerid Hellwig, Niemetal (DE)

(73) Assignee: Sartorius Stedim Biotech GmbH (DE)

(*) Notice: Subject to any disclaimer, the term of this patent is extended or adjusted under 35 U.S.C. 154(b) by 338 days.

(21) Appl. No.: 15/328,976

(22) PCT Filed: Jul. 18, 2015

(86) PCT No.: PCT/EP2015/001483
§ 371 (c)(1),
(2) Date: Jan. 25, 2017

(87) PCT Pub. No.: WO2016/055132
PCT Pub. Date: Apr. 14, 2016

(65) Prior Publication Data
US 2017/0209835 A1    Jul. 27, 2017

(30) Foreign Application Priority Data

Oct. 7, 2014   (DE) .................. 10 2014 114 544

(51) Int. Cl.
*B01D 65/02*    (2006.01)
*B01D 65/00*    (2006.01)
(Continued)

(52) U.S. Cl.
CPC .......... *B01D 65/022* (2013.01); *B01D 63/02* (2013.01); *B01D 63/04* (2013.01); *B01D 65/00* (2013.01);
(Continued)

(58) Field of Classification Search
CPC ...... B01D 65/022; B01D 65/00; B01D 63/04; B01D 63/02; B01D 2311/2653;
(Continued)

(56) References Cited

U.S. PATENT DOCUMENTS 4,707,268 A    11/1987  Shah et al.
4,869,822 A     9/1989  Kamei et al.
(Continued)

FOREIGN PATENT DOCUMENTS

DE    10 2005 033 314    1/2007
DE    10 2006 002 013    9/2007
(Continued)

OTHER PUBLICATIONS

Translation of International Preliminary Report on Patentability and Written Opinion for International Application No. PCT/EP2016/001483 dated Apr. 11, 2017.
(Continued)

*Primary Examiner* — Krishnan S Menon
*Assistant Examiner* — Waqaas Ali
(74) *Attorney, Agent, or Firm* — Gerald E. Hespos; Michael J. Porco; Matthew T. Hespos

(57) ABSTRACT

A filtration device (1) has a housing (4) and a filter module (2) with hollow fibers (32) surrounded by an outer shell (5). The hollow fiber bundle (6) is sealed to the outer shell (5) at each end by an adhesive (11) transverse to the longitudinal direction (10). Each end of the hollow fibers (32) is unclosed. An unfiltered product chamber (20) is between the outer shell (5) and a wall (19) of the filter housing (4) and a filtered product chamber (13) is inside the filter module (2). The bottom end of the filter module (2) connects with an intermediate section (3) that connects with a receptacle (17) of a bottom portion (15) of the filter housing (4). The intermediate section (3) forms a connection chamber (26)
(Continued)

facing the hollow fiber ends (29) and radial feed channels (28) connect the connection chamber (26) with the unfiltered product chamber (20).

10 Claims, 4 Drawing Sheets

(51) Int. Cl.
    *B01D 63/04*     (2006.01)
    *B01D 63/02*     (2006.01)

(52) U.S. Cl.
    CPC ............... *B01D 2311/2653* (2013.01); *B01D 2311/2657* (2013.01); *B01D 2313/13* (2013.01); *B01D 2313/16* (2013.01); *B01D 2313/20* (2013.01); *B01D 2313/23* (2013.01); *B01D 2313/32* (2013.01); *B01D 2315/08* (2013.01); *B01D 2319/04* (2013.01)

(58) Field of Classification Search
    CPC ........... B01D 2319/04; B01D 2313/32; B01D 2315/08; B01D 2313/23; B01D 2313/20; B01D 2313/16; B01D 2313/13; B01D 2311/2657
    See application file for complete search history.

(56) References Cited

U.S. PATENT DOCUMENTS

| | | | |
|---|---|---|---|
| 5,041,220 A * | 8/1991 | Lee ..................... | B01D 63/024 |
| | | | 210/321.8 |
| 6,383,385 B1 | 5/2002 | Brinke-Seiferth et al. | |
| 2015/0068968 A1* | 3/2015 | Chiu ..................... | B01D 61/20 |
| | | | 210/295 |
| 2016/0193570 A1* | 7/2016 | Kobayashi ........... | B01D 63/022 |
| | | | 210/232 |

FOREIGN PATENT DOCUMENTS

| | | |
|---|---|---|
| DE | 10 2013 003 525 | 9/2014 |
| EP | 1 302 227 | 4/2003 |
| TW | M474094 | 3/2014 |
| WO | 91/08782 | 6/1991 |

OTHER PUBLICATIONS

International Search Report dated Oct. 23, 2015.

\* cited by examiner

FILTRATION DEVICE

BACKGROUND

1. Field of the Invention

The invention relates to a filtration device comprising a filter housing that has a bottom housing portion and a top housing portion, and a filter module wherein at least one hollow fiber bundle made from hollow fibers is surrounded laterally by an external outer shell. Each end of the hollow fiber bundle is sealed hermetically to the outer shell by an adhesive layer provided transversely to the longitudinal direction.

2. Description of the Related Art

DE 10 2006 002 013 A1 discloses a filtration device that is formed as a hollow fiber capsule that may be operated in a "dead end" or static filtration mode. Here, the hollow fiber ends are closed at one end.

During operation of this capsule, a complete venting of the hollow fibers provided in the housing is not possible, as a result of which the theoretically available filtering surface cannot be utilized fully. Further, in the case of an undesired presence of air in the hollow fibers, there is a risk during a subsequent hot vapor sterilization that the hollow fibers get damaged by the thermal expansion of the air entrapped in the hollow fibers.

It is an object of the present invention to improve the filtration device known from DE 10 2006 002 013 A1 in such a way that a complete venting of the hollow fibers provided in the housing becomes possible and during sterilization of the filtration device with hot vapor (e.g. during "inline" evaporation), the risk of damage to the hollow fibers by the thermal expansion of the air entrapped in an undesired manner is prevented. The realization of these advantages according to the invention is of essential importance in particular for filtration devices that are used for static filtration.

SUMMARY

This object is achieved by a filtration device with a filter housing having a bottom housing portion and a top housing portion. The filtration device further has a filter module with at least one hollow fiber bundle of hollow fibers laterally surrounded by an outer shell. Each end of the hollow fiber bundle is sealed hermetically to the outer shell by an adhesive layer provided transverse to the longitudinal direction. Each of both hollow fiber ends of the hollow fibers is unclosed. The outer shell is formed in a liquid-tight manner. An unfiltered product chamber is provided between the outer shell and a housing wall of the filter housing and a filtered product chamber is provided inside of the filter module. The filter module is connected at the end thereof that is at the bottom in the vertical direction to an intermediate section that allows a connection with a receptacle of the bottom housing portion. The intermediate section has a connection chamber to the hollow fiber ends facing it and radial feed channels that connect the connection chamber delimited from the filtered product chamber with the unfiltered product chamber.

As a result of the outer shell being sealed, i.e. formed to be liquid-tight, and as a result of the radial feed channels of the intermediate section, the unfiltered product can enter into the dome of the upper housing portion along two parallel paths, namely first via the unfiltered product chamber formed between the outer shell and the housing wall of the filter housing, and second via the radial feed channels of the intermediate section and the inner channels of the hollow fibers. As a result of the fact that the unfiltered product is fed to the dome of the filter housing or the upper housing portion along two parallel paths, an automatic and complete venting of the filtration device becomes possible, which is a precondition for avoiding damage to the hollow fiber module during a subsequent vapor sterilization due to air expanding under thermal loading, so that inline evaporation (e.g. "pre-use autoclaving") or "Sterilizing In-Place" (SIP) can be carried out.

The intermediate section may be connected to an adapter that is matched to the receptacle of the bottom housing portion. By virtue of the adapter connected to the intermediate section, the filter module can be inserted into the receptacle of the bottom housing portion in a simple and quick manner.

The filter module may have a through-pipe at the bottom end thereof that connects the filtered product chamber with an outlet channel of the intermediate section and delimits the filtered product chamber from the connection chamber. As a result, the separation between the filtered product chamber and the unfiltered product chamber is ensured. The above-mentioned arrangement of the through-pipe in the bottom part of the filter module is of particular importance for the sterile filtration of the fluid entering into the filter module because the through-pipe allows a spatially separate discharge of the sterile filtrate through the intermediate section and the filtered product chamber along a path that is separate from both paths of the unfiltered product.

The bottom housing portion may have an inflow in communication with the unfiltered product chamber. The bottom housing portion may further have an outflow in communication with the filtered product chamber via the intermediate section.

The upper housing portion may have a vent at the top in the vertical direction. Here, the upper housing portion may be vented passively and automatically. As a result it becomes possible to fill the housing completely with fluid or liquid faster than in the case of the filter devices known from the prior art.

A plurality of hollow fiber bundles may be provided in the outer shell. Each of the hollow fiber bundles may be located in a fabric hose that is permeable to fluid. The fabric hose makes it easier to arrange or process the hollow fiber bundles.

The filter housing may be made from a plastic or a stainless steel. The outer shell may be made from a polypropylene and the adhesive layer may be formed as a sprue made from polyurethane.

Further features and advantages of the invention will become evident from the following specific description and the drawings.

DETAILED DESCRIPTION

A filtration device 1 comprises a filter module 2, an intermediate section 3 and a filter housing 4.

Figure 1:
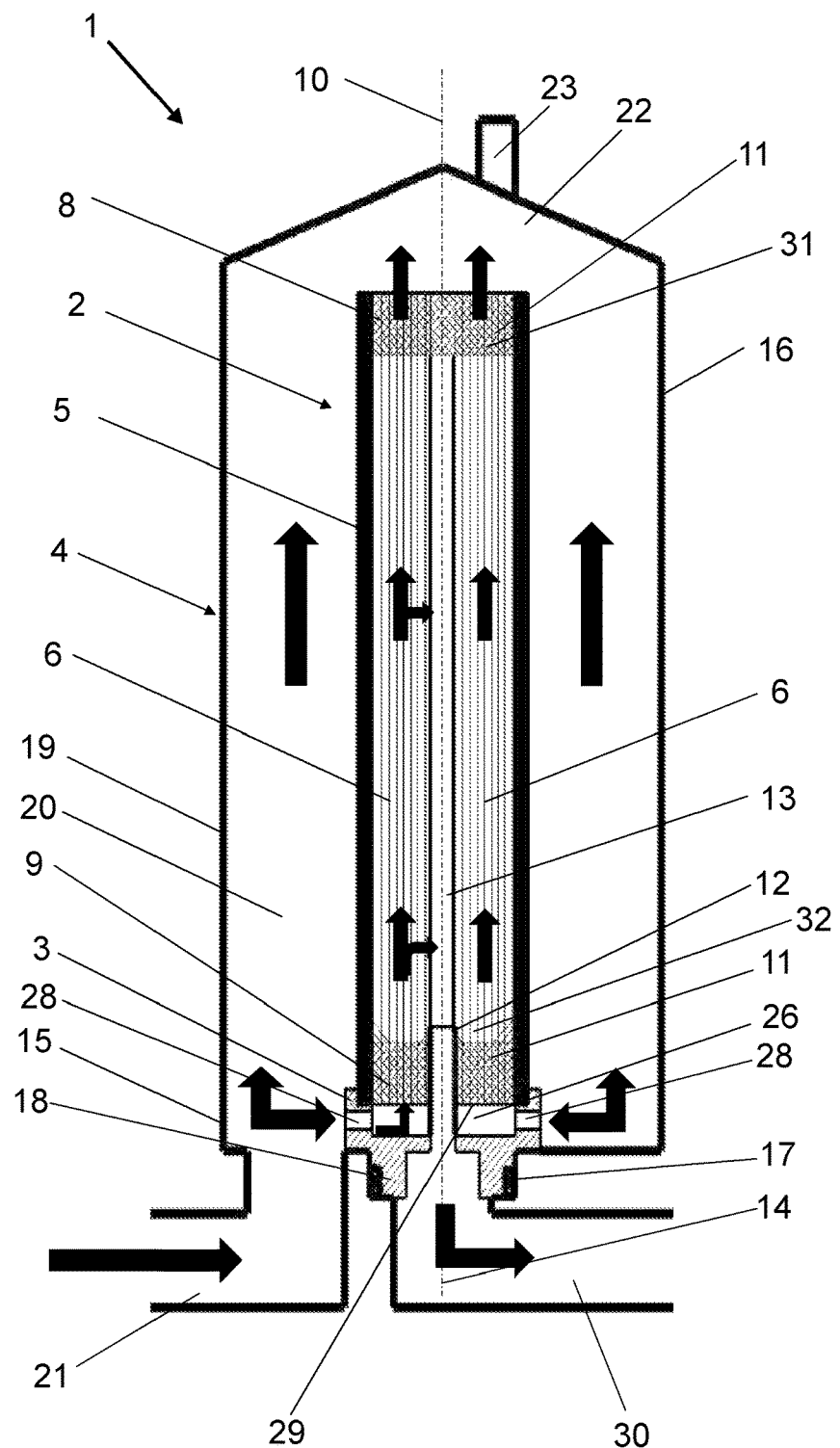
FIG. 1 shows a schematic lateral view in a section through a filtration device.
Figure 2:
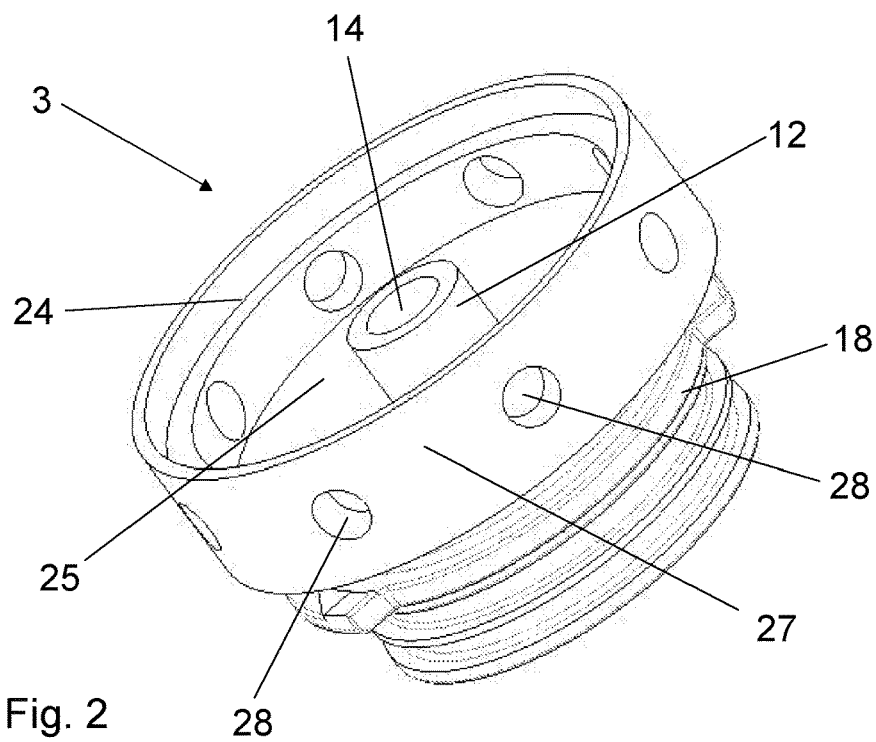
FIG. 2 shows a three-dimensional view of the intermediate section of FIG. 1 with an adapter.
Figure 3:
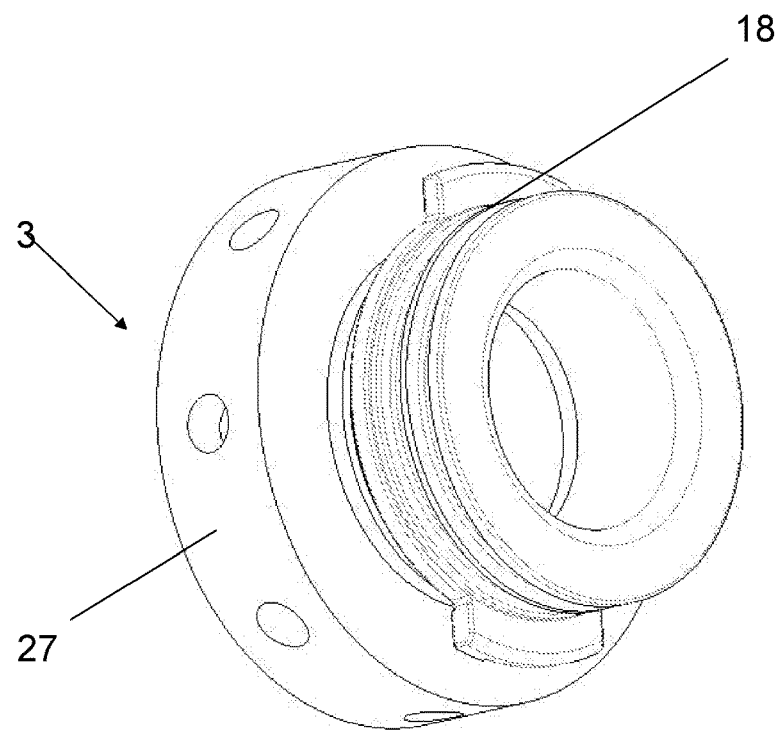
FIG. 3 shows a further three-dimensional view of the intermediate section of FIG. 1 from the bottom.
Figure 4:
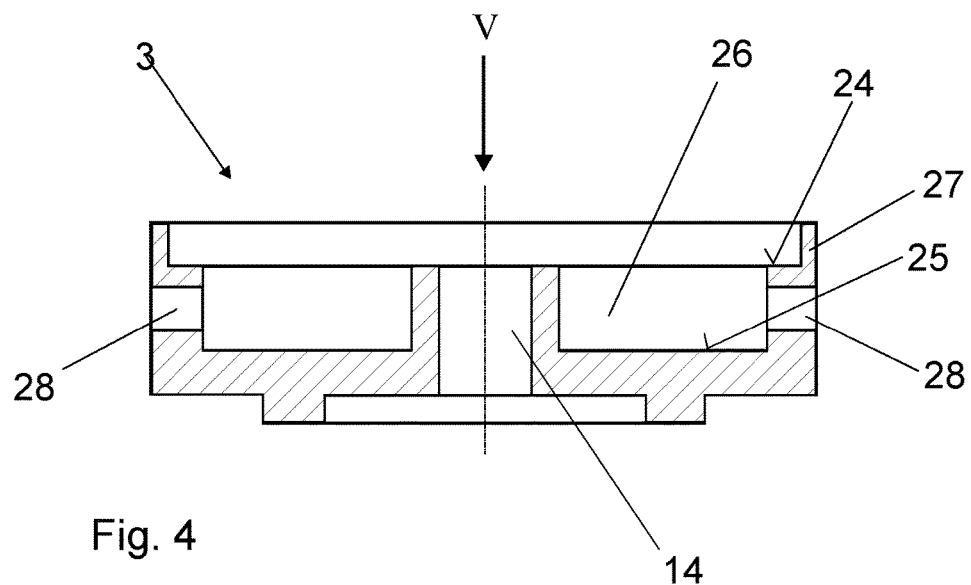
FIG. 4 shows a lateral view in a section through the intermediate section of FIG. 1 without an adapter.
Figure 5:
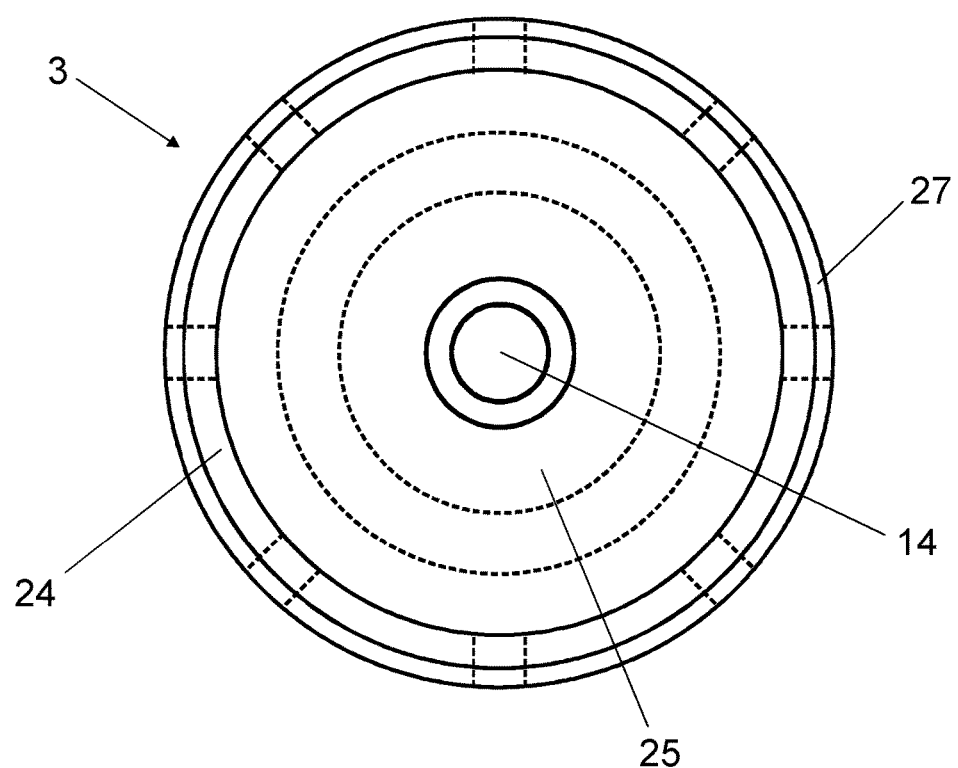
FIG. 5 shows a top view of the intermediate section of FIG. 4 from the direction V.
Figure 6:
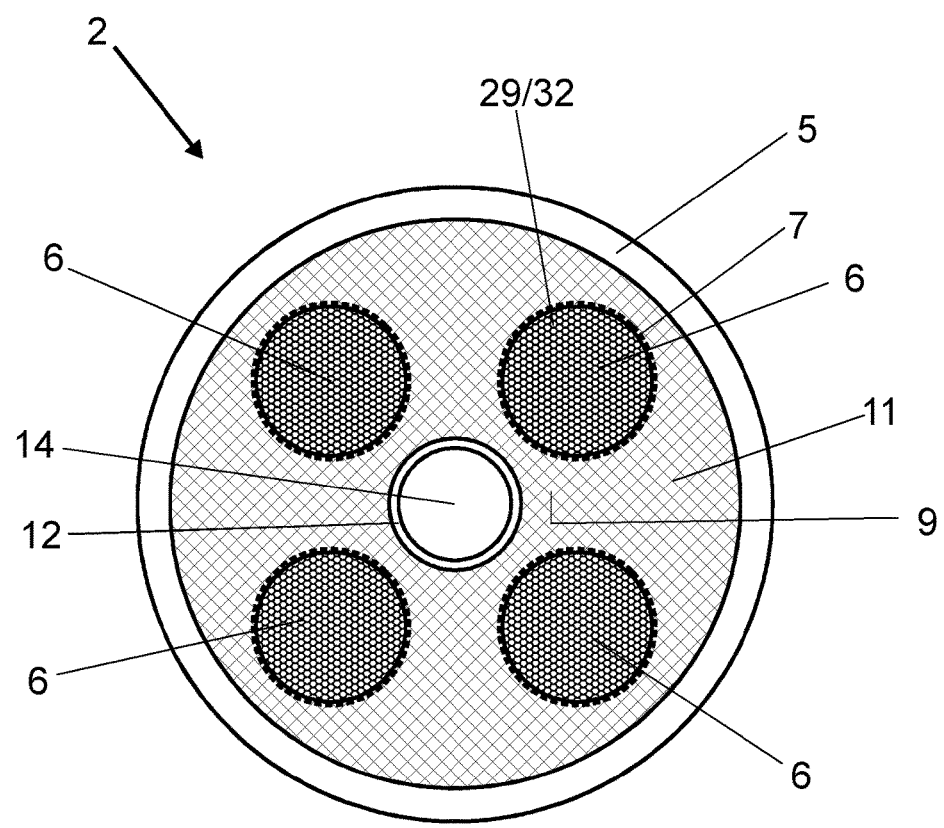
FIG. 6 shows a top view of the bottom end of the filter module without an intermediate section.

The filter module 2 comprises an outer shell 5 that is formed from a plastic pipe, for example from polypropylene (PP). The at least one hollow fiber bundle 6 is located in the outer shell 5. In the embodiment example of FIG. 6, four hollow fiber bundles 6 are arranged in the outer shell 5. Each of the hollow fiber bundles 6 is surrounded by a fluid-permeable fabric hose 7. Each of the hollow fiber bundles 6 is formed at the ends 8, 9 thereof with an adhesive layer 11 provided transversely to the longitudinal direction 10, which is formed for example as a sprue made from polyurethane, they are hermetically sealed or molded against each other and against the outer shell 5. In this connection, the filter module 2 has a through-pipe 12 at the bottom end 9 thereof that connects the filtered product chamber 13 formed between the hollow fiber bundles 6 with an outlet channel 14 of the intermediate section 3.

The filter housing 4 has a bottom housing portion 15 and a top housing portion 16. The bottom housing portion 15 has a receptacle 17 for receiving adapters 18 for filter modules 2. In correspondence with the embodiment examples, the adapter 18 is provided on the intermediate section 3 connected to the filter module 2.

An unfiltered product chamber 20 is formed between the outer shell 5 of the filter module 2 and a housing wall 19 of the filter housing 4. Here, the bottom housing portion 15 has an inflow 21 in communication with the unfiltered product chamber 20, through which medium to be filtered can be fed to the unfiltered product chamber 20.

The top housing portion 16 has a dome 22 that spans the free upper end 8 of the filter module 2 at the top in the vertical direction. At the top in the vertical direction, the top housing portion 16 has an optional vent 23. However, this vent 23 per se does not allow a complete venting of the hollow fiber bundle 6 as is made possible by the filtration device 1 according to the invention with two separate paths for unfiltered product and a separate path for filtered product. Rather, the optional vent 23 merely allows air to be discharged that is trapped beyond the top end 8 of the hollow fibers 32 in the top part of the dome 22.

The intermediate section 3 has a first shoulder 24 towards the bottom end 9 of the filter module 2 for receiving and connecting (for example by welding) the bottom end 9 of the filter module 2. A second shoulder 25, which is formed to be annular and which has its outlet channel 14 centrally located, forms a connection chamber 26 towards the hollow fiber ends facing it, i.e. towards the second end 9 of the filter module 2. In the outer wall 27 that delimits the connection chamber 26 radially outwards, radially orientated feed channels 28 are provided, via which the connection chamber connects the unfiltered product chamber 20 with the bottom open hollow fiber ends 29. The free end of the through-pipe 12 is connected, for example by welding, to the end of the outlet channel 14 that faces it, so that the filtered product chamber 13 is delimited against the connection chamber 26. The bottom housing portion 15 has a drain 30 in communication with the filtered product chamber 13 via the intermediate section 3, through which the filtered product can be discharged.

The filtration device 1, as part of a cartridge filter system (not shown) with a hollow fiber bundle 6 that is used for "dead end" or static filtration, may initially be vented automatically in a static filtration mode and can subsequently be sterilized reliably using hot vapor—pre-assembled in the cartridge filter system ("inline" evaporation after automatic venting). Further, the location of the intermediate section 3 in the adhesive layer 11 of the bottom part of the outer shell 5 allows two paths for unfiltered product separately from each other and one path for (sterile) filtered product to be provided, as a result of which the advantages of being able to automatically vent the hollow fibers 32 and the subsequent sterilizability with hot vapor are linked with the possibility of a sterile filtration of fluid in a static filtration operation ("dead-end filtration").

On the first path for unfiltered product, the unfiltered product is passed into the filtered product chamber 13 through the inflow 21, the unfiltered product chamber 20 and the upper end 8 of the hollow fiber bundle 6, each of the hollow fibers 32 of which are open at the top and bottom ends thereof. On the second path for unfiltered product, the unfiltered product is passed into the lumen of the hollow fibers 32 through the inflow 21, the feed channels 28 and through the bottom hollow fiber ends 29 and exits, like the unfiltered product coming from the first path for unfiltered product, from the filtration device 1 as sterile filtrate after passage through the hollow fiber walls along the filtrate path extending through the filtered product chamber 13, the through-pipe 12, the intermediate section 3 and the outlet channel 14.

It goes without saying that the embodiments discussed in the special description and shown in the figures only constitute illustrative embodiment examples of the present invention. In the light of this disclosure, a broad spectrum of variation possibilities will be available to a person skilled in the art.

LIST OF REFERENCE NUMERALS

1 Filtration device
2 Filter module
3 Intermediate section
4 Filter housing
5 Outer shell of 2
6 Hollow fiber bundle of 2
7 Fabric hose of 6
8 Top end of 2, 6
9 Bottom end of 2, 6
10 Longitudinal direction
11 Adhesive layer
12 Through-pipe of 2
13 Filtered product chamber of 2
14 Outlet channel of 3
15 Bottom housing portion of 4
16 Top housing portion of 4
17 Receptacle of 15
18 Adapter of 3
19 Housing wall of 4
20 Unfiltered product chamber
21 Inflow
22 Dome of 16
23 Vent
24 First shoulder of 3
25 Second shoulder of 3
26 Connection chamber of 3
27 Outer wall of 3
28 Feed channels
29 Bottom hollow fiber end of 32
30 Drain 31 Top hollow fiber end of 32
32 Hollow fiber

The invention claimed is:

1. A filtration device (1) comprising: a filter housing (4) having a bottom housing portion (15) and a top housing portion (16); and a filter module (2) with at least one hollow fiber bundle (6) of hollow fibers (32) laterally surrounded by an outer shell (5), each end of the hollow fiber bundle (6) being sealed hermetically to the outer shell (5) by an adhesive layer (11) provided transversely to the longitudinal direction (10), wherein
- each of the hollow fiber ends (29, 31) of the hollow fibers (32) is unclosed, the outer shell (5) is formed to be liquid-tight,
- an unfiltered product chamber (20) is provided between the outer shell (5) and a housing wall (19) of the filter housing (4) and a filtered product chamber (13) is provided inside of the filter module (2),
- the filter module (2) is connected by its bottom end (9) in the vertical direction to an intermediate section (3) that is connected with a receptacle (17) of the bottom housing portion (15), and
- the intermediate section (3) forms a connection chamber (26) with the hollow fiber ends (29) facing the connection chamber (26) and radial feed channels (28) that connect the connection chamber (26) delimited from the filtered product chamber (13) with the unfiltered product chamber (20)
- wherein upper ends of the hollow fibers communicate with the unfiltered product chamber so that an unfiltered product enters the upper ends of the hollow fibers via the unfiltered product chamber and also enters the bottom ends of the hollow fibers via the unfiltered product chamber, the radial feed channels and the connection chamber.

2. The filtration device (1) of claim 1,
wherein
the intermediate section (3) is connected with an adapter (18) that is matched to the receptacle (17) of the bottom housing portion (15).

3. The filtration device (1) of claim 1,
wherein,
the filter module (2) has a through-pipe (12) at the bottom end (9) thereof, the through pipe connecting the filtered product chamber (13) with an outlet channel (14) of the intermediate section (3) and delimiting the filtered product chamber (13) from the connection chamber (26).

4. The filtration device (1) of claim 1,
wherein
the bottom housing portion (15) has an inflow (21) in communication with the unfiltered product chamber (20).

5. The filtration device (1) of claim 1, wherein
the bottom housing portion (15) has a drain (30) in communication with the filtered product chamber (13) via the intermediate section (3).

6. The filtration device (1) of claim 1,
wherein
the upper housing portion (16) has a vent (23) at the top in the vertical direction.

7. The filtration device (1) of claim 1,
wherein
plural hollow fiber bundles (6) are provided in the outer shell (5).

8. The filtration device (1) of claim 7,
wherein
each of the hollow fiber bundles (6) is provided in a fluid-permeable fabric hose (7).

9. The filtration device (1) of claim 1,
wherein,
the filter housing (4) is made from a plastic or a stainless steel.

10. The filtration device (1) of claim 1,
wherein,
the outer shell (5) is made from a polypropylene and the adhesive layer (11) is formed as a sprue made from polyurethane.

* * * * *